United States Patent
Lo et al.

(10) Patent No.: US 11,620,821 B2
(45) Date of Patent: Apr. 4, 2023

(54) APPARATUS AND METHOD FOR IMAGE-GUIDED AGRICULTURE

(71) Applicant: GEOSAT Aerospace & Technology Inc., Tainan (TW)

(72) Inventors: Cheng-Fang Lo, Tainan (TW); Kuang-Yu Chen, Tainan (TW); Te-Che Lin, Tainan (TW); Hsiu-Hsien Wen, Tainan (TW); Ting-Jung Chang, Tainan (TW)

(73) Assignee: GEOSAT Aerospace & Technology, Tainan (TW)

(*) Notice: Subject to any disclaimer, the term of this patent is extended or adjusted under 35 U.S.C. 154(b) by 343 days.

(21) Appl. No.: 16/912,636

(22) Filed: Jun. 25, 2020

(65) Prior Publication Data

US 2021/0406538 A1    Dec. 30, 2021

(51) Int. Cl.
| | |
|---|---|
| *G06V 20/10* | (2022.01) |
| *H04N 5/232* | (2006.01) |
| *G06T 7/55* | (2017.01) |
| *G06T 17/20* | (2006.01) |
| *G06K 9/62* | (2022.01) |

(Continued)

(52) U.S. Cl.
CPC .......... *G06V 20/188* (2022.01); *B64C 39/024* (2013.01); *B64D 27/24* (2013.01); *B64D 47/08* (2013.01); *G05D 1/0016* (2013.01); *G05D 1/0038* (2013.01); *G05D 1/101* (2013.01); *G06K 9/6267* (2013.01); *G06T 7/55* (2017.01); *G06T 17/20* (2013.01); *H04N 5/2253* (2013.01); *H04N 5/232* (2013.01); *B64C 2201/021* (2013.01); *B64C 2201/042* (2013.01); *B64C 2201/127* (2013.01); *B64C 2201/14* (2013.01); *G06T 2207/10028* (2013.01); *G06T 2207/10032* (2013.01)

(58) Field of Classification Search
None
See application file for complete search history.

(56) References Cited

U.S. PATENT DOCUMENTS

| | | |
|---|---|---|
| 2016/0050840 A1 | 2/2016 | Sauder et al. |
| 2021/0034075 A1 | 2/2021 | Daniel et al. |
| (Continued) | | |

FOREIGN PATENT DOCUMENTS

CN   111047566 A   4/2020

OTHER PUBLICATIONS

Kyriacos Themistocleous, "Model reconstruction for 3d vizualization of cultural heritage sites using open data from social media: The case study of Soli, Cyprus", 2016. (Year: 2016).*

(Continued)

*Primary Examiner* — Nicholas R Wilson
(74) *Attorney, Agent, or Firm* — Finnegan, Henderson, Farabow, Garrett & Dunner, L.L.P

(57) ABSTRACT

A method for image-guided agriculture includes capturing images based on one or more ground sampling distance values; processing the images to generate an orthophoto image of a target area; performing feature classification of the orthophoto image to identify corresponding crop information in regions of the target area; and assessing crop conditions in the regions based on one or more vegetation indices and the corresponding crop information in the regions.

17 Claims, 15 Drawing Sheets

(51) Int. Cl.
    *B64C 39/02*     (2023.01)
    *B64D 47/08*     (2006.01)
    *B64D 27/24*     (2006.01)
    *G05D 1/00*     (2006.01)
    *G05D 1/10*     (2006.01)
    *H04N 5/225*     (2006.01)

(56) References Cited

U.S. PATENT DOCUMENTS

| | | |
|---|---|---|
| 2021/0078706 A1 | 3/2021 | Lin et al. |
| 2021/0149406 A1 | 5/2021 | Javault et al. |
| 2021/0174080 A1 | 6/2021 | Nakagawa et al. |
| 2021/0304368 A1 | 9/2021 | Takashima |

OTHER PUBLICATIONS

Itkin et al., "Development of Cloud-Based UAV Monitoring and Management System", 2012. (Year: 2012).*
Haala et al., "Performance Test on UAV-Based Photogrammetric Data Collection", 2011. (Year: 2011).*

* cited by examiner

APPARATUS AND METHOD FOR IMAGE-GUIDED AGRICULTURE

TECHNICAL FIELD

The present disclosure generally relates to farming and, more particularly, to apparatuses, systems, and methods for image-guided agriculture.

BACKGROUND

Traditional agriculture relies heavily on manpower, which often results in issues such as inconsistent performance and high labor costs. For farms having diversified and fragmented lands, managing large-scale farm units could be a complicated and time-consuming process for farmers. Accordingly, there is a need for greater automation and computerized analysis to improve agricultural processes to reduce workload and manpower demand, and to increase farming effectiveness and efficiency.

SUMMARY

The present disclosure provides a non-transitory computer-readable medium storing instructions executable by a processor to perform a method for image-guided agriculture. The method for image-guided agriculture includes: controlling an unmanned aerial vehicle to capture images based on one or more ground sampling distance values; processing the images to generate an orthophoto image of a target area; performing feature classification of the orthophoto image to identify corresponding crop information in regions of the target area; and assessing crop conditions in the regions based on one or more vegetation indices and the corresponding crop information in the regions.

The present disclosure also provides a method for image-guided agriculture. The method for image-guided agriculture includes capturing images based on one or more ground sampling distance values; processing the images to generate an orthophoto image of a target area; performing feature classification of the orthophoto image to identify corresponding crop information in regions of the target area; and assessing crop conditions in the regions based on one or more vegetation indices and the corresponding crop information in the regions.

The present disclosure further provides a system for image-guided agriculture. The system for image-guided agriculture includes an unmanned aerial vehicle and a server including a memory device storing instructions and a processor coupled to the memory device. The unmanned aerial vehicle includes one or more motors configured to drive one or more propulsion units of the unmanned aerial vehicle, and one or more cameras installed on the unmanned aerial vehicle. The processor is configured to execute the instructions to: cause the unmanned aerial vehicle to navigate the unmanned aerial vehicle through a target area along a route; cause the unmanned aerial vehicle to capture images by the one or more cameras based on one or more ground sampling distance values during the navigation; process the images to generate an orthophoto image of a target area; perform feature classification of the orthophoto image to identify corresponding crop information in regions of the target area; and assess crop conditions in the regions based on one or more vegetation indices and the corresponding crop information in the regions.

It is to be understood that the foregoing general description and the following detailed description are exemplary and explanatory only, and are not restrictive of the disclosure, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses, systems, and methods consistent with aspects related to the disclosure as recited in the appended claims.

Figure 1:
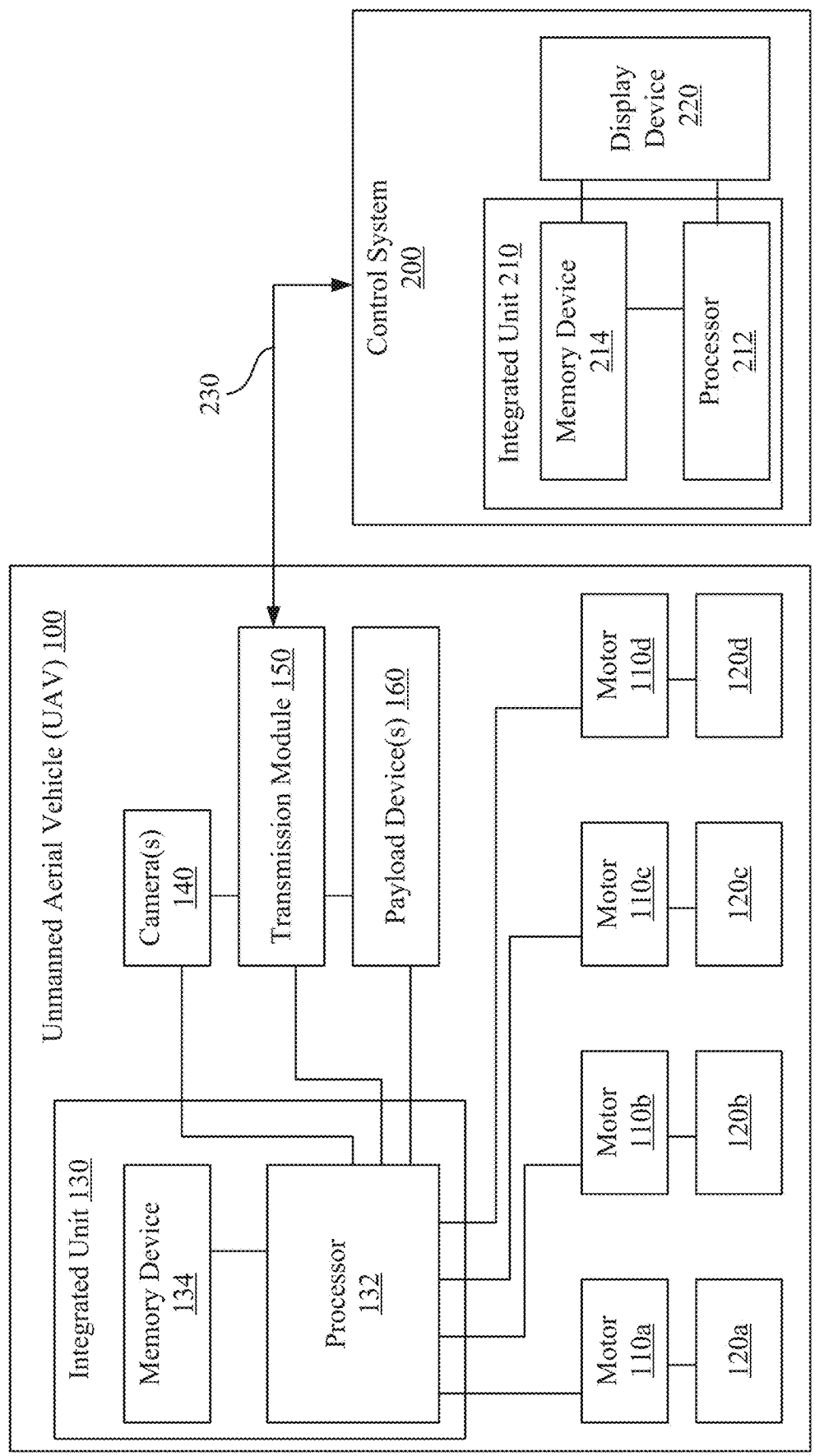
FIG. 1 is a diagram which illustrates an exemplary system for image-guided agriculture, consistent with some embodiments of the present disclosure.

FIG. 1 is a diagram which illustrates an exemplary system 10 for image-guided agriculture, consistent with some embodiments of the present disclosure. Generally, the term "agriculture" in the present disclosure relates to farming, harvesting, crops, crop-scouting, and other related activities as will occur to one of ordinary skill in the art. As shown in FIG. 1, system 10 for image-guided agriculture includes an unmanned aerial vehicle (UAV) 100 and a control system 200. In some embodiments, control system 200 may be a desktop computer, a laptop, a tablet, a smartphone, a remote server, or any other electronic devices. The user can run an application on control system 200 to transmit wireless signals to UAV 100 or to receive data from UAV 100 to control UAV 100 accordingly.

UAV 100 includes one or more motors 110a-110d, one or more propulsion units 120a-120d, an integrated unit 130, one or more cameras 140, a transmission module 150, and one or more payload device(s) 160. In some embodiments, UAV 100 may also include ailerons for generating a rolling motion to enable UAV 100 to pitch, roll, or yaw. Motors 110a-110d are coupled to propulsion units 120a-120d respectively and are configured to provide propulsion to UAV 100. For example, propulsion units 120a-120d may be propellers, air jets, or any other propulsion device. In various embodiments, the number of motors 110a-110d and propulsion units 120a-120d may be different, and UAV 100 illustrated in FIG. 1 is merely an example and not meant to limit the present disclosure. For example, UAV 100 may have one, two, three, four, five, six, seven, eight, or any number of motors respectively coupled with propulsion units.

Integrated unit 130 is communicatively coupled to motors 110a-110d and configured to control motors 110a-110d to provide lift and propulsion in various flight operations, such as ascending, descending, approximate hovering, or transiting. For example, integrated unit 130 may be configured to transmit driving signals to drive motors 110a-110d to respectively control rotational speed of motors 110a-110d.

Camera(s) 140 are communicatively coupled to integrated unit 130 and configured to capture one or more images. More particularly, camera(s) 140 may be configured to convert optical signals into electrical signals that contain information of captured images, and to transmit the converted electrical signals to integrated unit 130 for image processing and recognition. In some embodiments, camera(s) 140 may include one or more RGB cameras, infrared cameras, or multispectral cameras, or any combination thereof, but the present disclosure is not limited thereto.

Transmission module 150 is configured to transmit data to and communicate with control system 200 or other electronic devices, such as a display, a server, a computer system, a datacenter, or other UAVs, a cloud computing or edge computing server, through various communication circuit(s) and antenna(s) (not shown). In some embodiments, UAV 100 sends and receives communication signals 230 to/from control system 200 by means of communication circuit(s) and antenna(s) in transmission module 150 via radio frequency (RF) signals or any type of wireless network. For example, transmission module 150 may include a Radio Controller (RC) transmitter/receiver. UAV 100 can receive a radio signal from an external remote controller, by means of the RC transmitter/receiver. Accordingly, a user can control UAV 100 to perform operations by means of the remote controller. In some embodiments, transmission module 150 may also include other wireless signal transmitters/receivers, such as a Bluetooth module, a Wi-Fi module, etc.

Payload device(s) 160 may be various devices carried by UAV 100 for different purposes. For example, payload device(s) 160 may include a sprayer unit having a nozzle for discharging liquid and a storage container for storing water, pesticide, herbicide, fertilizer, etc. In some embodiments, payload device(s) 160 may also include various sprinkler attachments for herbicides and granular fertilizers application. Accordingly, UAV 100 carrying the sprayer unit is capable to perform pesticide application, herbicide application, watering, fertilizer application, or other farming activities.

In some embodiments, payload device(s) 160 may also include one or more multispectral cameras, infrared cameras, or RGB cameras mentioned above. Alternatively stated, in some embodiments, the camera devices for capturing images may be embedded or integrated in UAV 100. In some embodiments, the camera devices can be mounted on UAV 100 as external payload devices, which are removable from UAV 100.

As shown in FIG. 1, in some embodiments, integrated unit 130 includes a processor 132 and a memory device 134 storing instructions for controlling UAV 100. More particularly, memory device 134 can store data and/or software instructions executed by processor 132 to perform operations consistent with the disclosed embodiments. For example, processor 132 can be configured to execute a set of instructions stored in memory device 134 to cause UAV 100 to perform a method for image-guided agriculture, which is discussed in detail below.

Control system 200 may also include an integrated unit 210 having a processor 212 and a memory device 214 storing instructions, and a display device 220 as an input/output interface of control system 200. Integrated unit 210 may also be configured to perform data processing and corresponding operations in the method for image-guided agriculture, which is also discussed in detail below.

Processors 132, 212 can include, for example, one or more Central Processing Units (CPUs), one or more Graphics Processing Units (GPUs), or other types of microprocessors. Memory devices 134, 214 can be various computer-readable media implemented in any method or technology for storage of information such as computer-readable instructions, data structures, program modules, or other data. Memory devices 134, 214 can be communicatively coupled with processors 132, 212, respectively, via a bus. In some embodiments, memory devices 134, 214 may include a main memory, such as, for example, a random access memory (RAM) or other dynamic storage device, which can be used for storing temporary variables or other intermediate information during execution of instructions by processors 132, 212. Such instructions enable UAV 100 or control system 200 to perform operations specified by the instructions.

In some embodiments, before being loaded into memory devices 134, 214, the instructions may be stored in any of non-transitory storage media. The term "non-transitory media" as used herein refers to any non-transitory media storing data or instructions that cause a machine to operate in a specific fashion. Such non-transitory media can include non-volatile media and/or volatile media. Non-transitory media include, for example, optical or magnetic disks, dynamic memory, a floppy disk, a flexible disk, hard disk, solid state drive, magnetic cassettes, magnetic tape, or any other magnetic data storage medium, a CD-ROM, digital versatile disks (DVD) or any other optical data storage medium, a Random Access Memory (RAM), a read-only memory (ROM), a Programmable Read-Only Memory (PROM), a EPROM, a FLASH-EPROM, NVRAM, flash memory, or other memory technology and/or any other storage medium with the same functionality that can be contemplated by persons of ordinary skill in the art to which this disclosure pertains.

Accordingly, integrated unit 130 in UAV 100 can function as a flight control computer (FCC) for controlling UAV 100. For example, the FCC may be configured to control motors 110a-110d to speed up or slow down UAV 100. In some embodiments, FCC may increase or decrease a rotational speed of one or more of motors 110a-110d. For example, integrated unit 130 can independently control revolutions per minute (RPM) of each of motors 110a-110d during the flight.

Other components known to persons of ordinary skill in the art may be included in UAV 100 to process, transmit, provide, and receive information consistent with the disclosed embodiments. For example, UAV 100 may include an attitude and heading reference system (AHRS). An AHRS (not shown) includes one or more sensors on three axes that provide attitude information, such as a roll angle, a pitch angle, and/or a yaw angle, of UAV 100. The sensors of the AHRS may also be referred to as magnetic, angular rate, and gravity (MARG) sensors, and include either solid-state or microelectromechanical systems (MEMS) gyroscopes, accelerometers, and magnetometers. The AHRS may include an on-board processing system which provides attitude and heading information. In some embodiments, the AHRS may provide attitude determination of UAV 100, and may also form part of an inertial navigation system of UAV 100.

Figure 2:
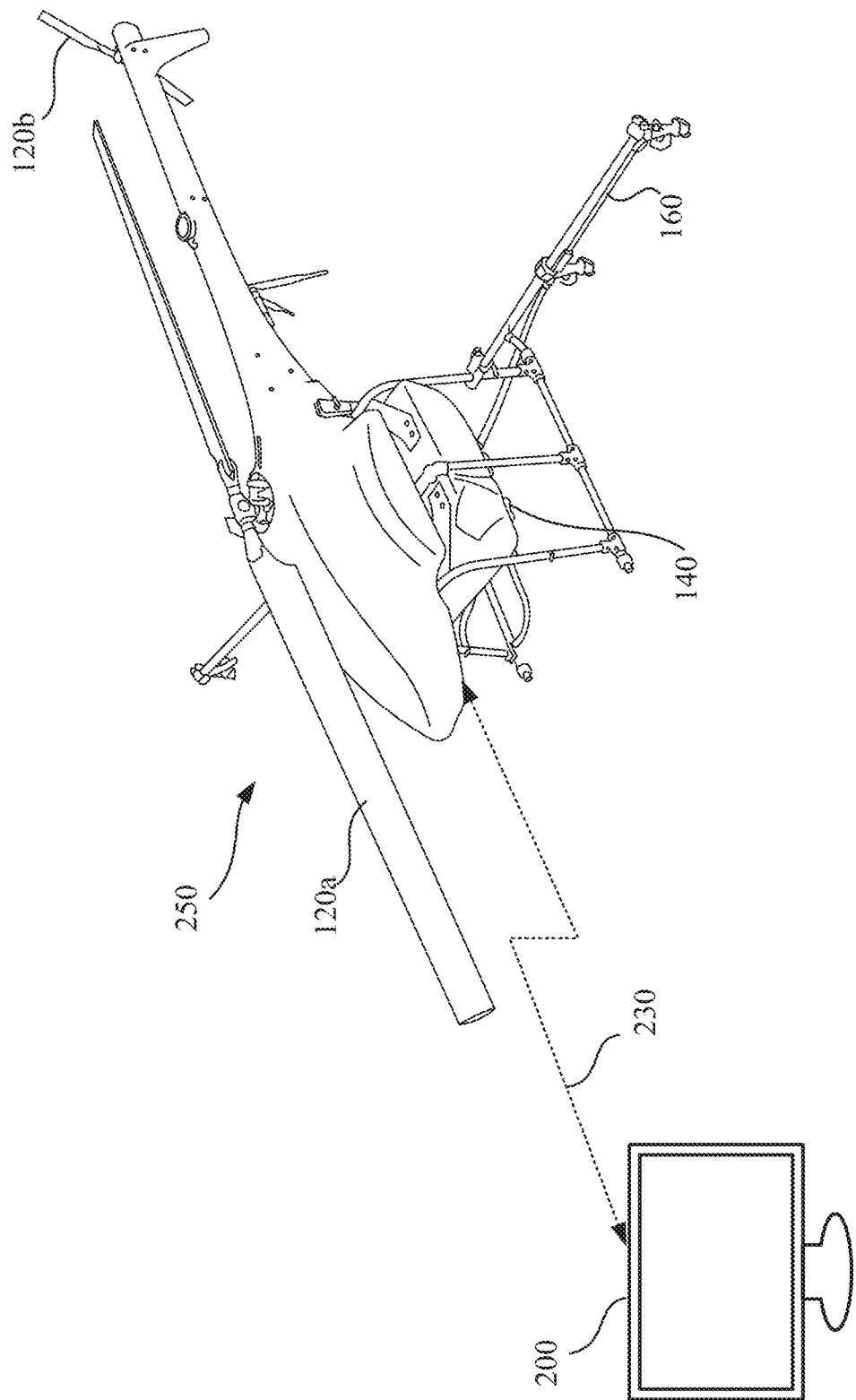
FIG. 2 is a diagram which illustrates an unmanned aerial vehicle (UAV) and an exemplary control system, consistent with some embodiments of the present disclosure.

FIG. 2 is a diagram which illustrates exemplary representations of UAV 250 corresponding to UAV 100 of FIG. 1 and control system 200 of FIG. 1, consistent with some embodiments of the present disclosure. A user may control UAV 250 to perform flight operations and set one or more operating parameters of UAV 250 through control system 200, in order to execute operations for image-guided agriculture, such as monitoring and measuring of the development of crops, detecting bacterial or fungal infections, and rapidly responding to such infections.

For example, control system 200 may include a ground control station (GCS). In some embodiments, the GCS can be run on a desktop computer, a laptop, a tablet, a smartphone, or any other electronic device. The user can input one or more instructions to control system 200. After receiving the instruction(s), control system 200 may transmit communication signal 230 to communicate with UAV 250.

As shown in FIG. 2, in some embodiments, camera(s) 140 can be arranged at a bottom side of UAV 250 (e.g., the side facing towards the ground when UAV 250 hovers). As a result, camera(s) 140 can be configured to capture images and obtain information about one or more objects underneath UAV 250, such as size, shape, or color of the object(s). Similar to camera(s) 140, in some embodiments, payload device(s) 160 can also be mounted and arranged at the bottom side of UAV 250.

Figure 3:
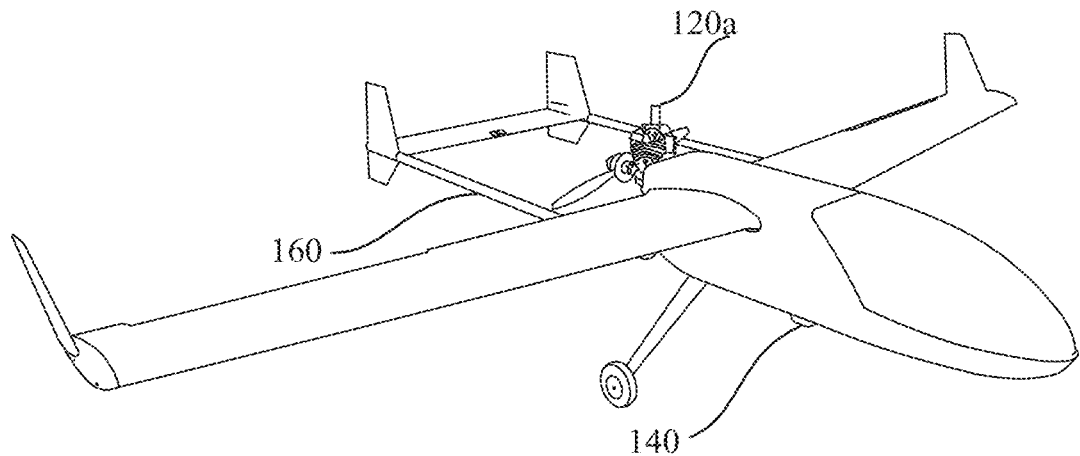
FIG. 3 and FIG. 4 are diagrams which respectively illustrate exemplary designs of UAVs, consistent with some embodiments of the present disclosure.
Figure 4:
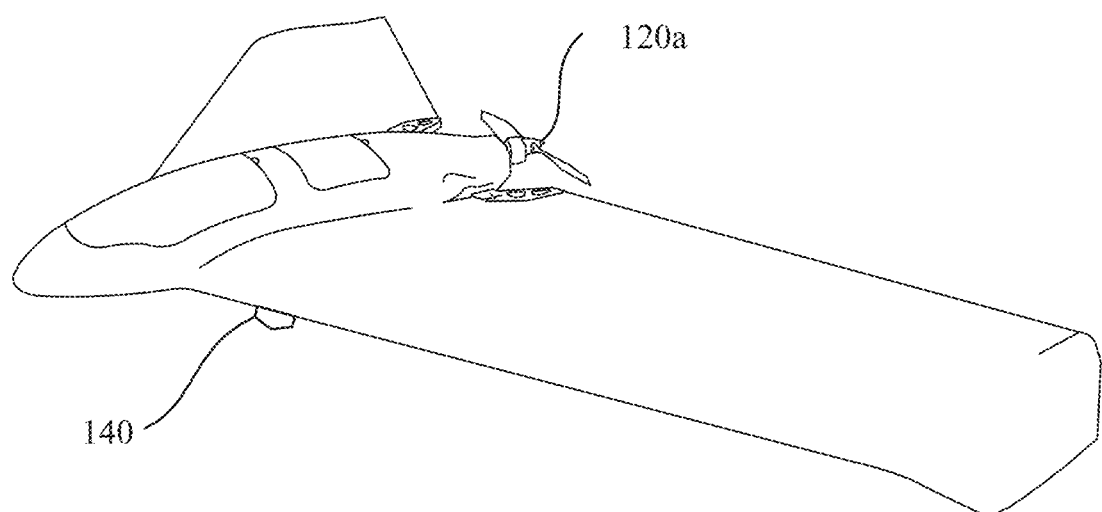

FIG. 3 and FIG. 4 are diagrams which respectively illustrate exemplary UAVs 300 and 400 corresponding to UAV 100 of FIG. 1, consistent with some embodiments of the present disclosure. UAVs 300 and 400 may have alternative designs compared to UAV 250 shown in FIG. 2. A person of ordinary skill will now understand that designs and drone shapes of UAV 100 can vary according to implementation, and certain adaptations and modifications can be made. Accordingly, the designs shown in FIG. 2, FIG. 3, and FIG. 4 are only for illustrative purposes and are not intended to limit the present disclosure.

Figure 5:
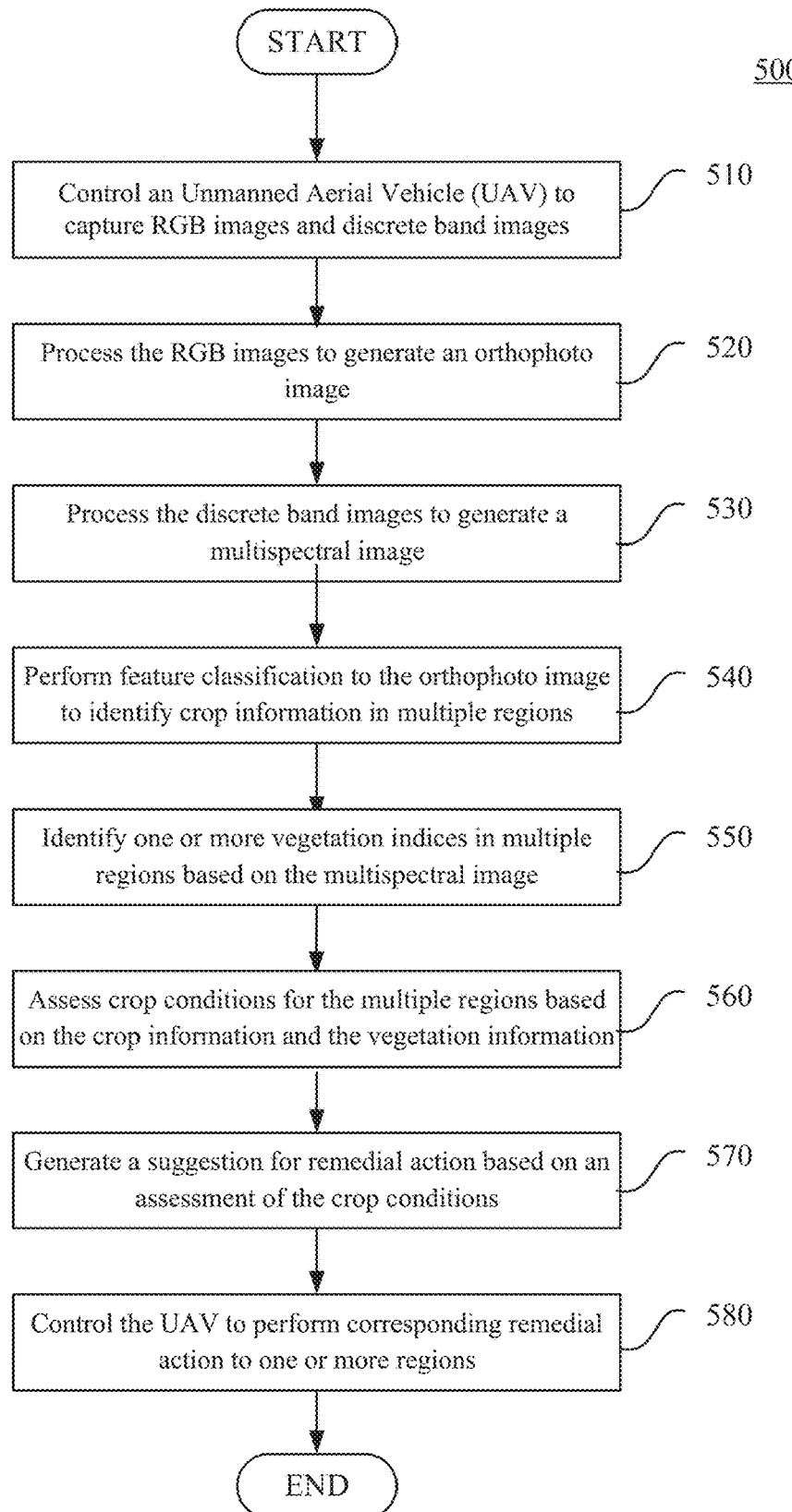
FIG. 5 is a flow diagram of an exemplary method for image-guided agriculture, consistent with some embodiments of the present disclosure.

FIG. 5 is a flow diagram of an exemplary method 500 for image-guided agriculture, consistent with some embodiments of the present disclosure. Method 500 can be performed by system 10 including UAV 100 (or any other UAV having comparable capabilities, including UAVs 250, 300, and 400 disclosed herein) and a server (e.g., control system 200 in FIGS. 1 and 2), but the present disclosure is not limited thereto. In some embodiments, steps of method 500 can be performed by integrated units 130 and 210. More particularly, in integrated units 130 and 210, processors 132 and 212 can be configured to execute instructions respectively stored in memory devices 134 and 214 to cause integrated units 130 and 210 to perform steps of method 500 for image-guided agriculture at both the UAV side and the server side.

In step 510, a server (e.g., control system 200 in FIGS. 1 and 2) controls UAV 100 to capture images by one or more cameras (e.g., cameras 140 in FIG. 1). In some embodiments, the captured images include RGB images captured by one or more RGB cameras, and discrete band images captured by multispectral cameras. "Discrete band images" as used herein refer to multispectral images acquired in different discrete spectral bands (e.g., blue, green, red, red-edge, and near-infrared spectrums). These images are captured based on one or more corresponding ground sampling distance (GSD) values during the navigation of UAV 100. GSD indicates the distance between two consecutive pixel centers measured on the ground. The GSD value is related to the flight height. That is, in addition to the camera configuration, the GSD value depends on the altitude of UAV 100 when capturing the images. For example, a GSD of 5 cm indicates that one-pixel width in the image represents linearly 5 cm on the ground, and a GSD of 10 cm indicates that one-pixel width in the image represents linearly 10 cm on the ground. A larger GSD value of images results in lower spatial resolution, and less visible details. For different types of crops or crops in different plant growth stages, different GSD values may be configured, manually or automatically based on previous assessments, to balance the image quality and the processing time.

For example, for rice seedlings in early or tiller stages of the development, the pattern shown in images with 5 cm GSD is clearer than the pattern shown in images with 10 cm GSD. Thus, images with 5 cm GSD can provide more subtle features, such as blade color, symptoms, and agronomic characters, and thus are helpful for monitoring growth condition. On the other hand, in a post-harvest stage, both images with 5 cm GSD and with 10 cm GSD can be used to identify burned rice field patterns after harvest. Similarly, for sugarcane fields in early or mature stages, compared to images with 10 cm GSD, images with 5 cm GSD can provide detailed features to distinguish weeds from early developing sugarcane plants and to identify leaf shapes for each sugarcane plants.

In some embodiments, RGB images and discrete band images may be captured during different navigation sessions in which UAV 100 navigates at different altitudes. Accordingly, the RGB images and discrete band images obtained in different sessions may have different GSD values and different image sizes. For example, RGB images may have a GSD of about 5.2 cm, which are captured when UAV 100 navigates at a height above ground level (AGL) of about 230 m. On the other hand, discrete band images may have a GSD of about 30.1 cm, which are captured when UAV 100 navigates at a height above ground level (AGL) of 454 m. In some other embodiments, the RGB images and discrete band images may also be captured during the same navigation session. Accordingly, the captured RGB images and discrete band images may have the same or different GSD values. In addition, the number of RGB images captured by RGB camera(s) and the number of discrete band images per band captured by multispectral camera(s) may be the same or different.

In some embodiments, the captured images can be transmitted as communication signal 230 to control system 200 via wireless communication in real-time or be transmitted via wired communication after UAV 100 terminates the navigation mission and returns to the ground. Thus, control system 200 may receive these images to perform the image processing and other calculations in following steps 520-580. For ease of explanation, in the following embodiments, various image processing and operations in steps 520-580 are performed by control system 200, but the present disclosure is not limited thereto. In some embodiments, processor 132 in UAV 100 may also perform part of or all image processing and operations in steps 520-580 and transmit the result to control system 200 for displaying the data on display device 220 of control system 200. Particularly, part of or all image processing in steps 520-580 may be achieved by a Central Processing Unit (CPU), a Graphics Processing Unit (GPU), or both.

Figure 6:
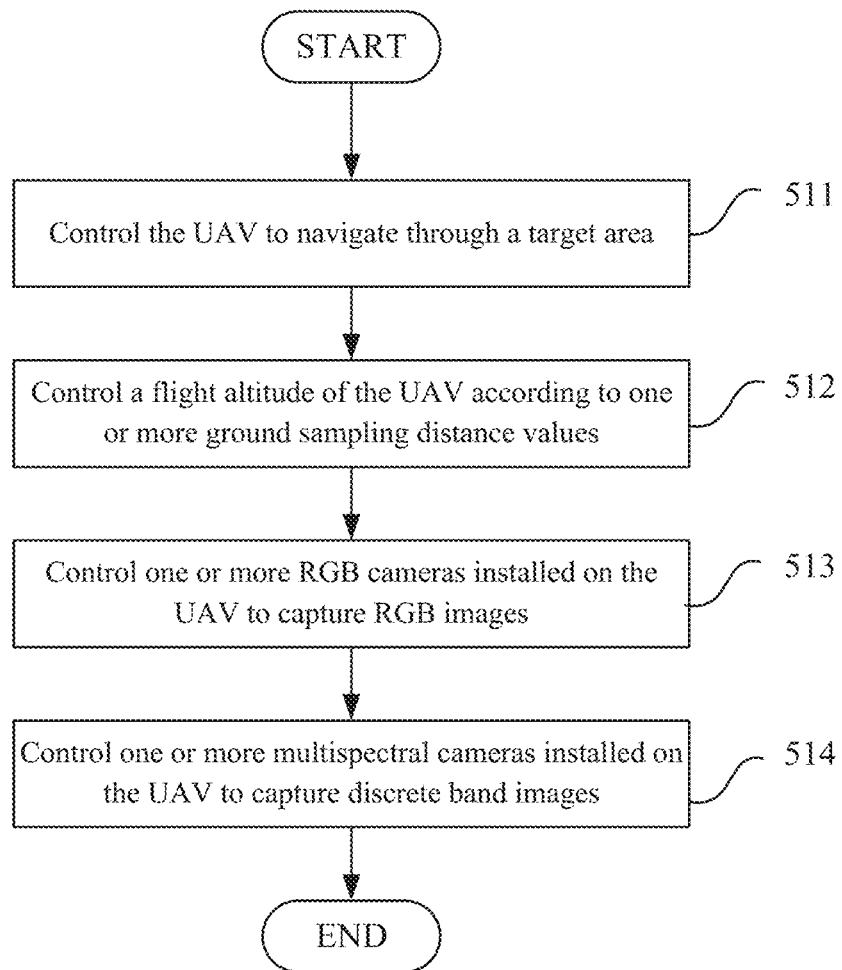
FIG. 6 is a flow diagram illustrating, in greater detail of, one step of the exemplary method in FIG. 5, consistent with some embodiments of the present disclosure.

Reference is made to FIG. 6, which is a flow diagram illustrating, in greater detail of, step 510 of exemplary method 500 in FIG. 5, consistent with some embodiments of the present disclosure. In step 511, control system 200 controls UAV 100 to navigate through a target area along a route. In step 512, control system 200 controls a flight altitude of UAV 100 according to one or more GSD values during navigation. By communicating with control system 200, UAV 100 may navigate through the target area and control its flight altitude along the route by operations of the FCC and AHRS in UAV 100. In some embodiments, an orthophoto image can be obtained based on images with the same or different GSD values. The orthophoto image is an aerial image that has been geometrically corrected so that the image is uniform from edge to edge. Particularly, in some embodiments, control system 200 may determine different GSD values for the images corresponding to regions of the target area, and then adjust the flight altitude of UAV 100 when UAV 100 is navigating through the regions.

In step 513, control system 200 controls one or more RGB cameras, e.g., included with camera(s) 140, installed on UAV 100 to capture RGB images during the navigation. The RGB camera(s) may have CCD or CMOS sensors to capture images in visible spectrum ranging from around 400 nm to around 700 nm.

In step 514, control system 200 controls one or more multispectral cameras, e.g., included with camera(s) 140, installed on UAV 100 to capture discrete band images during the navigation. The multispectral cameras include multiple sensing units corresponding to different spectral bands. For example, in some embodiments, multispectral cameras may include five sensing units for a blue spectrum ranging from around 465-485 nm, a green spectrum ranging from around 550-570 nm, a red spectrum ranging from around 663-673 nm, a red-edge spectrum ranging from around 712-722 nm, and a near-infrared spectrum ranging from around 820-860 nm. During the navigation, the multispectral cameras capture five discrete spectral band images correspond to five spectral bands at each way point, i.e., predetermined geographical positions in terms of latitude and longitude coordinates along the route.

Figure 7:
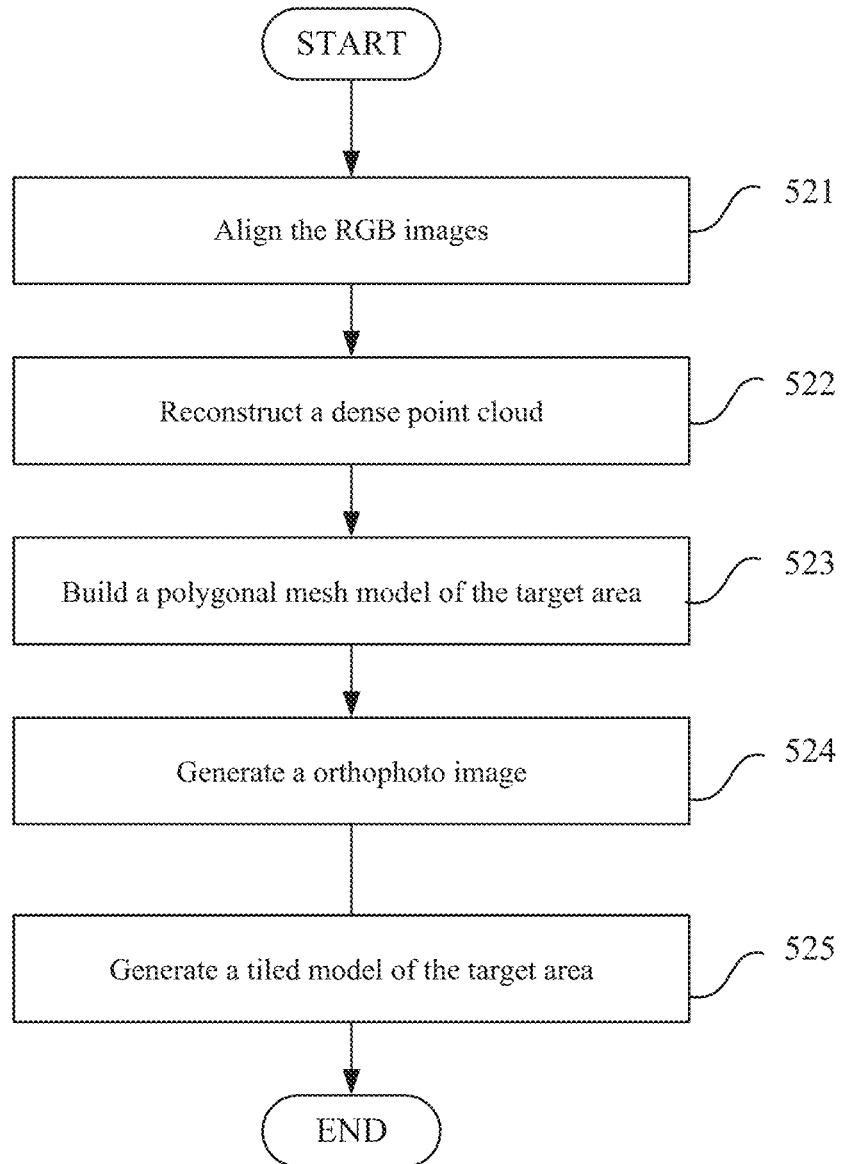
FIG. 7 is a flow diagram illustrating, in greater detail of, another step of the exemplary method in FIG. 5, consistent with some embodiments of the present disclosure.

With reference to FIG. 5, in step 520, UAV 100 or control system 200 processes images to generate the orthophoto image of a target area. In some embodiments, the orthophoto image can be generated by processing the RGB images. Reference is made to FIG. 7, which is a flow diagram illustrating, in greater detail of, step 520 of the exemplary method 500 in FIG. 5, consistent with some embodiments of the present disclosure. In some embodiments, step 520 may include steps 521, 522, 523, 524, and 525.

Figure 8A:
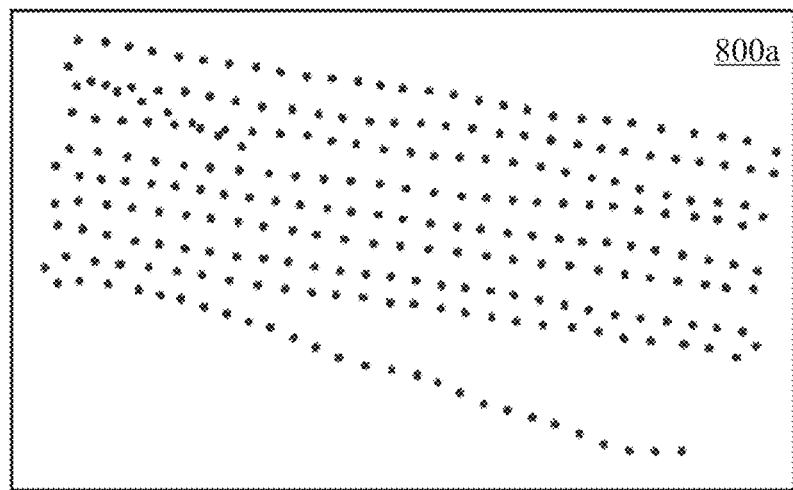
FIG. 8A-8F are diagrams or images illustrating operations of processing RGB images of a target area, consistent with some embodiments of the present disclosure.
Figure 8B:
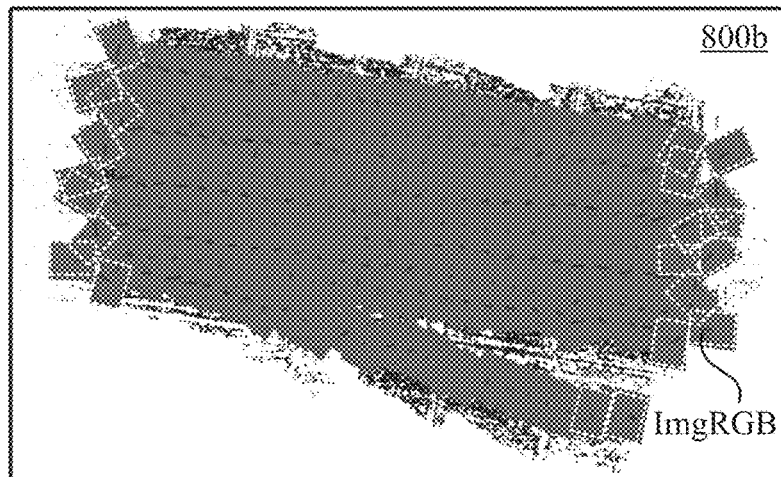

In step 521, control system 200 processes the RGB images captured in step 510 by aligning the RGB images based on the route along which UAV 100 is navigated and timestamps or geolocations associated with the RGB images. FIG. 8A is a diagram 800a illustrating exemplary waypoints along the route of UAV 100 during the navigation through the target area, consistent with some embodiments of the present disclosure. At the waypoints along the route, RGB images are captured and the timestamps or the geolocations associated with the RGB images are recorded. FIG. 8B is a diagram 800b representing the RGB images being aligned based on the route of UAV 100 and the associated timestamps or geolocations, consistent with some embodiments of the present disclosure. Multiple RGB images ImgRGB are aligned at respective angles and positions to cover the region shaded gray. The angles and positions can be determined based on the timestamps or geolocations associated with the RGB images ImgRGB. For clarity, in FIG. 8B, only RGB images ImgRGB at edge regions are denoted by dashed line borders, and further annotation is omitted.

Figure 8C:
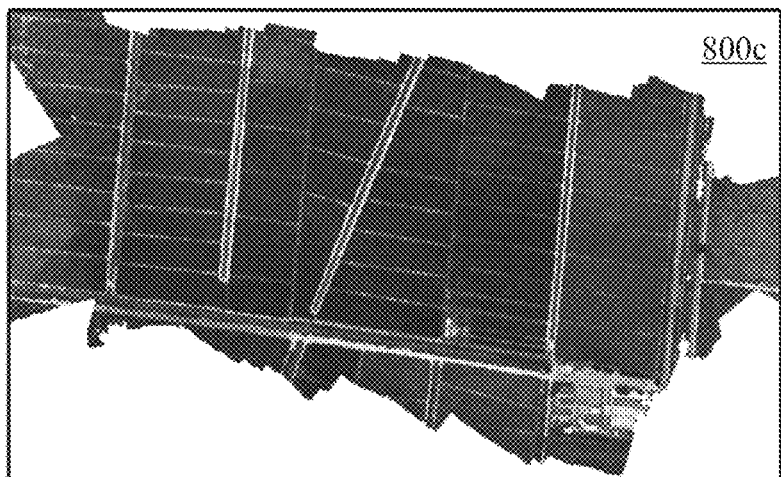

In step 522, control system 200 processes the aligned RGB images to reconstruct a dense point cloud based on the RGB images and corresponding camera positions. The dense point cloud is a collection of 2D or 3D coordinates of points of a region of interest (e.g., the target area). FIG. 8C is an image 800c representing the dense point cloud reconstructed based on the aligned RGB images shown in FIG. 8B, consistent with some embodiments of the present disclosure. By reconstructing the dense point cloud, information gathered from all RGB images will be processed and used to create a match between RGB images and the resulting dense point cloud of the region of interest, which can later be used for modeling.

Figure 8D:
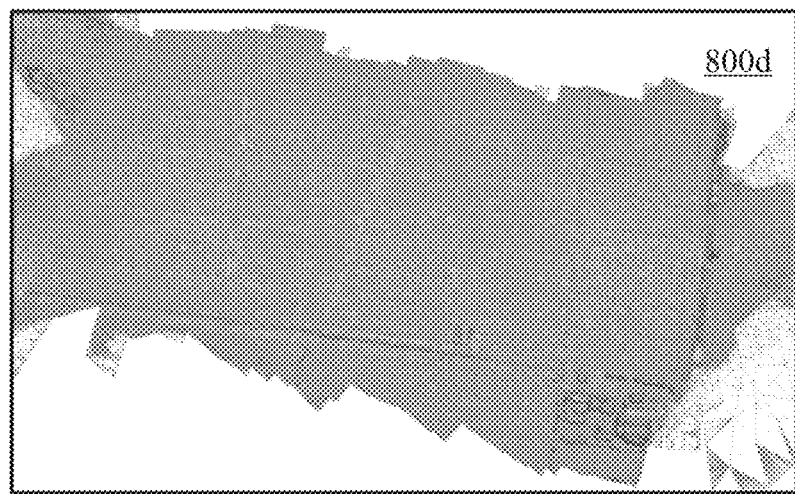

After the dense point cloud is reconstructed, in step 523, control system 200 builds a polygonal mesh model of the target area based on the dense point cloud. FIG. 8D is an image 800d representing the polygonal mesh model built based on the dense point cloud shown in FIG. 8C, consistent with some embodiments of the present disclosure. When analyzing a region of interest, control system 200 may remove spurious information which is unwanted or not relevant to the features of interest. Accordingly, the dense point cloud may be cleared of such information. After the spurious information has been removed, control system 200 can build the polygonal mesh model accordingly. For example, in some embodiments, the Poisson algorithm can be used for building the polygonal mesh model.

Figure 8E:
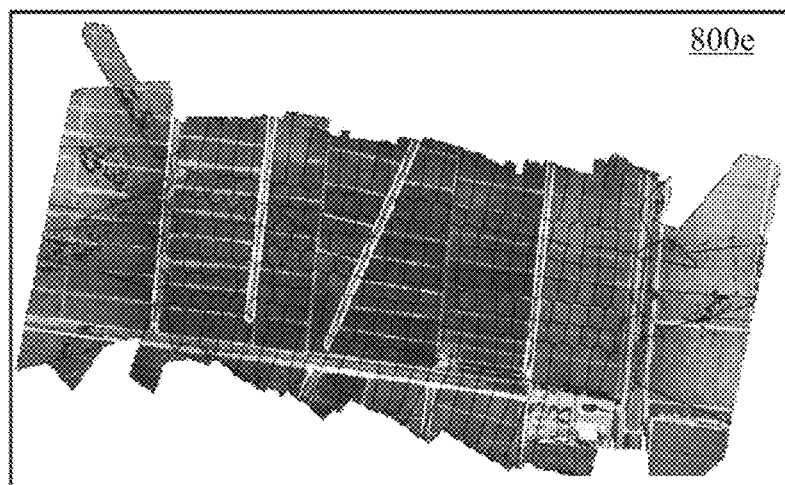

In step 524, control system 200 generates an orthophoto image based on the polygonal mesh model of the target area. FIG. 8E is an exemplary orthophoto image 800e generated based on the polygonal mesh model shown in FIG. 8D, consistent with some embodiments of the present disclosure. Orthophoto image 800e can be created based on the polygonal mesh model shown in image 800d by mapping information (e.g., color information on the points) modelled within the polygonal mesh model to generate a complete orthomosaic (i.e., geometrically-corrected orthophotos assembled into a composite image) over the region of interest, in which the scale is uniform in the region of interest.

Figure 8F:
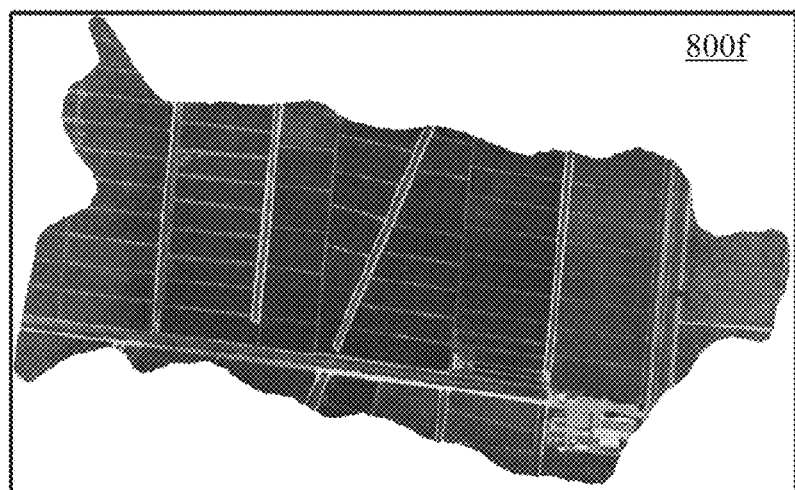

In some embodiments, control system 200 may further perform step 525 to generate a tiled model based on the orthophoto image to identify the multiple regions of the target area. FIG. 8F is an image 800f representing the tiled model generated based on orthophoto image 800e shown in FIG. 8E, consistent with some embodiments of the present disclosure. The tiled model can include a set of tiles and provide a recursive subdivision of a portion of the region of interest, which provides more efficient 2D or 3D visualization. The size of the pixel and the size of the tile can be defined by the user according to actual needs.

Figure 8G:
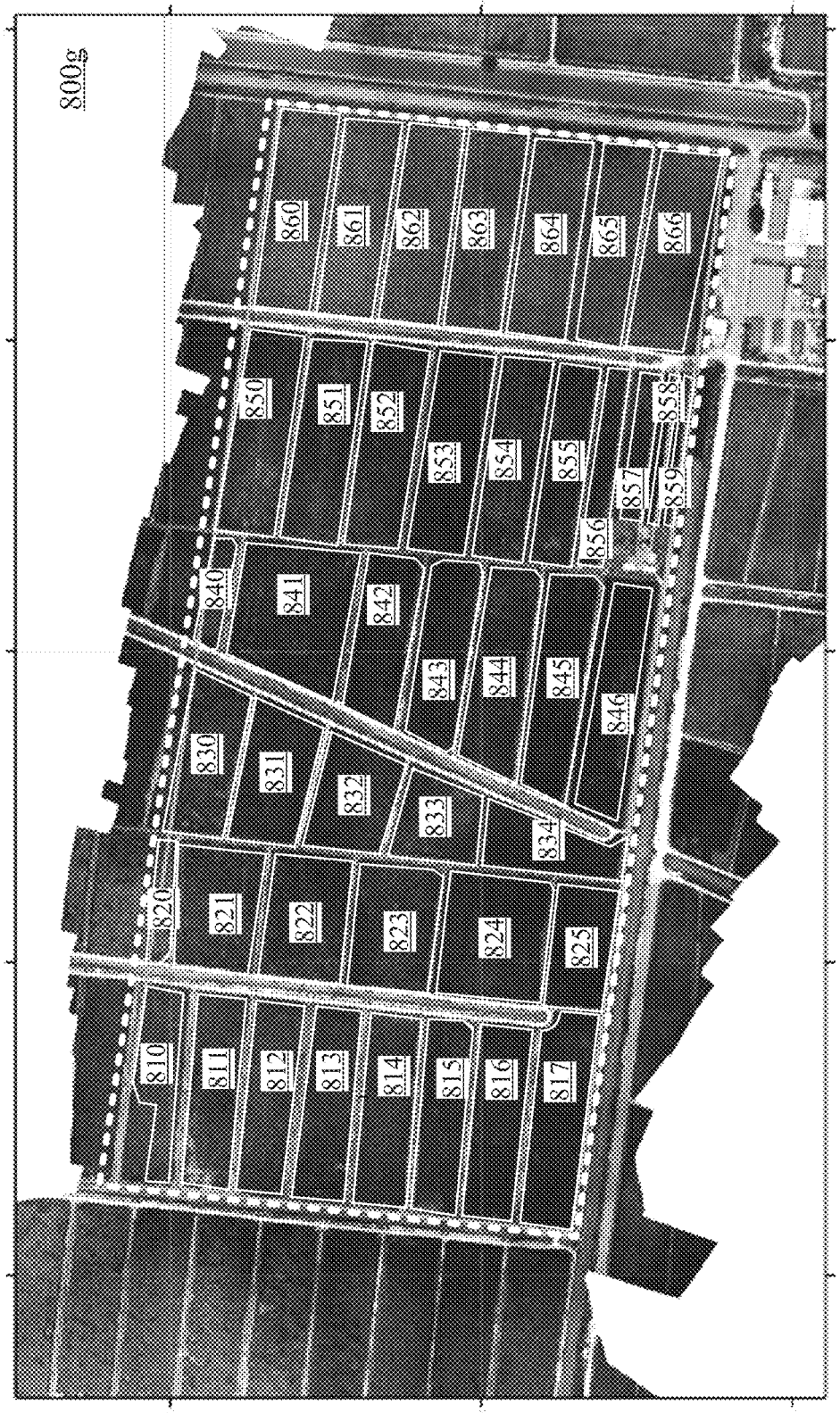
FIG. 8G is a diagram illustrating an orthophoto image, generated by processing the RGB images of the target area, consistent with some embodiments of the present disclosure.

FIG. 8G is an orthophoto image 800g, with multiple regions identified, generated by processing the RGB images of a target area, consistent with some embodiments of the present disclosure. As shown in FIG. 8G, the target area (denoted by dashed line borders) may include multiple regions 810-817, 820-825, 830-834, 840-846, 850-859, 860-866 (e.g., paddy fields).

Figure 9:
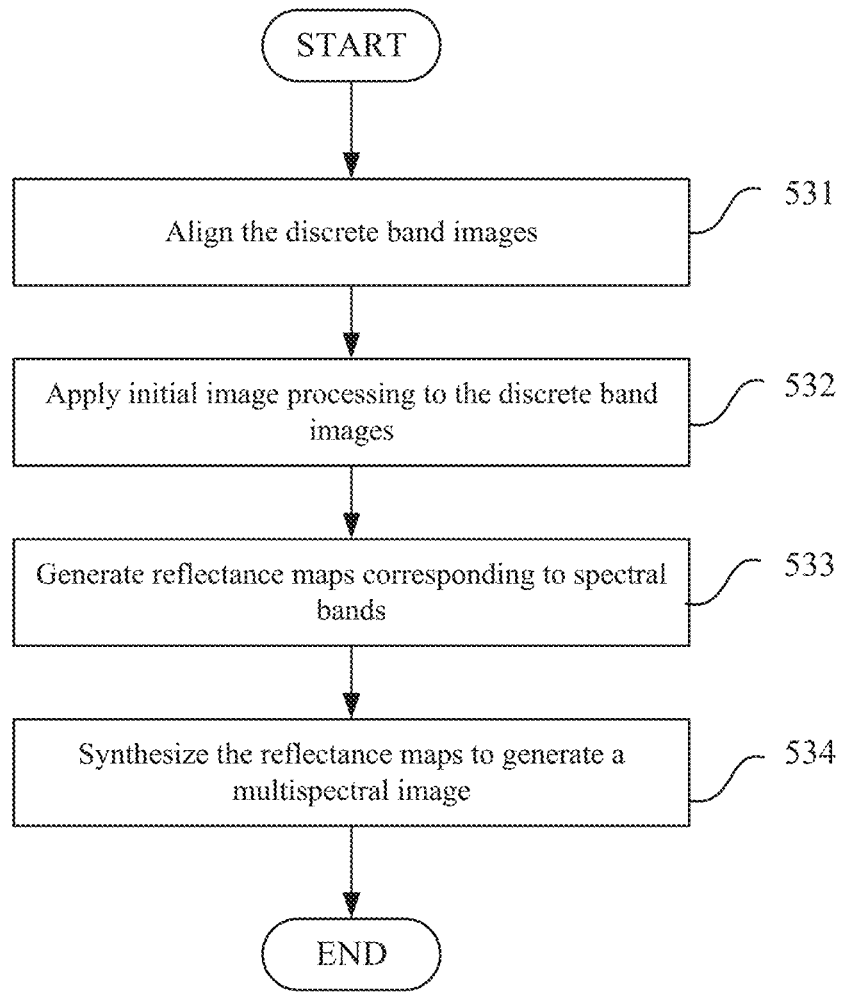
FIG. 9 is a flow diagram illustrating, in greater detail of, yet another step of the exemplary method in FIG. 5, consistent with some embodiments of the present disclosure.

Referring again to FIG. 5, in step 530, UAV 100 or control system 200 processes images captured by camera(s) 140 to generate a multispectral image of the target area. In some embodiments, the multispectral image can be generated by processing the discrete band images. Reference is made to FIG. 9, which is a flow diagram illustrating, in greater detail of, step 530 of the exemplary method 500 in FIG. 5, consistent with some embodiments of the present disclosure. In some embodiments, step 530 may include steps 531, 532, 533, and 534.

In step 531, control system 200 processes the discrete band images and aligns these images based on the route along which UAV 100 is navigated and the timestamps or the geolocations associated with the discrete band images. In step 532, control system 200 applies initial image processing to the discrete band images. For example, control system 200 may perform noise reduction, image compression or optimization, etc., to the discrete band images.

After the initial image processing is completed, in step 533, control system 200 generates reflectance maps corresponding to spectral bands. For example, control system 200 may generate five reflectance maps respectively associated with a blue spectral band (around 465-485 nm), with a green spectral band (around 550-570 nm), with a red spectral band (around 663-673 nm), with a red-edge spectral band (around 712-722 nm), and with a near-infrared spectral band (around 820-860 nm). Then, in step 534, control system 200 synthesizes the reflectance maps associated with the different spectral bands to generate a multispectral image that includes vegetation index information. Particularly, the vegetation index information may be obtained based on the reflectance information for spectral bands stored in the generated multispectral image.

Referring again to FIG. 5, in step 540, UAV 100 or control system 200 performs feature classification of the orthophoto image generated in step 520 to identify corresponding crop information in multiple regions of the target area. In some embodiments, the crop information includes types of crops and corresponding plant growth stages in the regions. Particularly, various image processing algorithms can be used to detect and isolate various desired portions, shapes, or features of the orthophoto image. In some embodiments, Machine Learning or other AI-related techniques may be applied to perform the feature classification.

For example, by the image processing, control system 200 may detect a special leaf shape known as "blades" of sugarcane plants and identify which region(s) are sugarcane fields. Similarly, control system 200 may detect an open-center canopy of mango trees, or tillers of rice plants, etc., to identify region(s) of mango trees and of rice plants. Moreover, control system 200 may further identify the plant growth stages of crops. For example, ratoon sugarcanes indicate that sugarcane plants have been harvested, and white bags identified between branches indicate that mango trees are in a harvest stage and farmers have applied a bagging treatment to protect fruits from pests and diseases.

Figure 10:
FIG. 10 is a diagram illustrating an image with corresponding crop information identified in multiple regions, consistent with some embodiments of the present disclosure.

FIG. 10 is a diagram illustrating an image 1000 with corresponding crop information identified in multiple regions, consistent with some embodiments of the present disclosure. As shown in FIG. 10, a target area may include different types of crops or crops in different plant growth stages. Regions 1010-1019 are classified as sugarcane fields in step 540. Regions 1010-1022 are classified as sugarcane fields in step 540. Regions 1030-1034 are classified as mango trees, and regions 1040-1042 are classified as rice fields in step 540. In some embodiments, control system 200 may further identify other crops, soil for agriculture, landscape plants, water body regions, roads, etc., of the target area shown in FIG. 10 based on the orthophoto image. For example, some farmers may apply crop rotation, and the harvested lands identified in the orthophoto image can be classified as soil for agriculture.

Accordingly, by performing feature classification of the orthophoto image, various crop information can be obtained and recorded. The recorded results can be stored in a local memory device (e.g., memory device 134 or memory device 214) or be transmitted to a cloud server for further analysis or access.

Figure 11A:
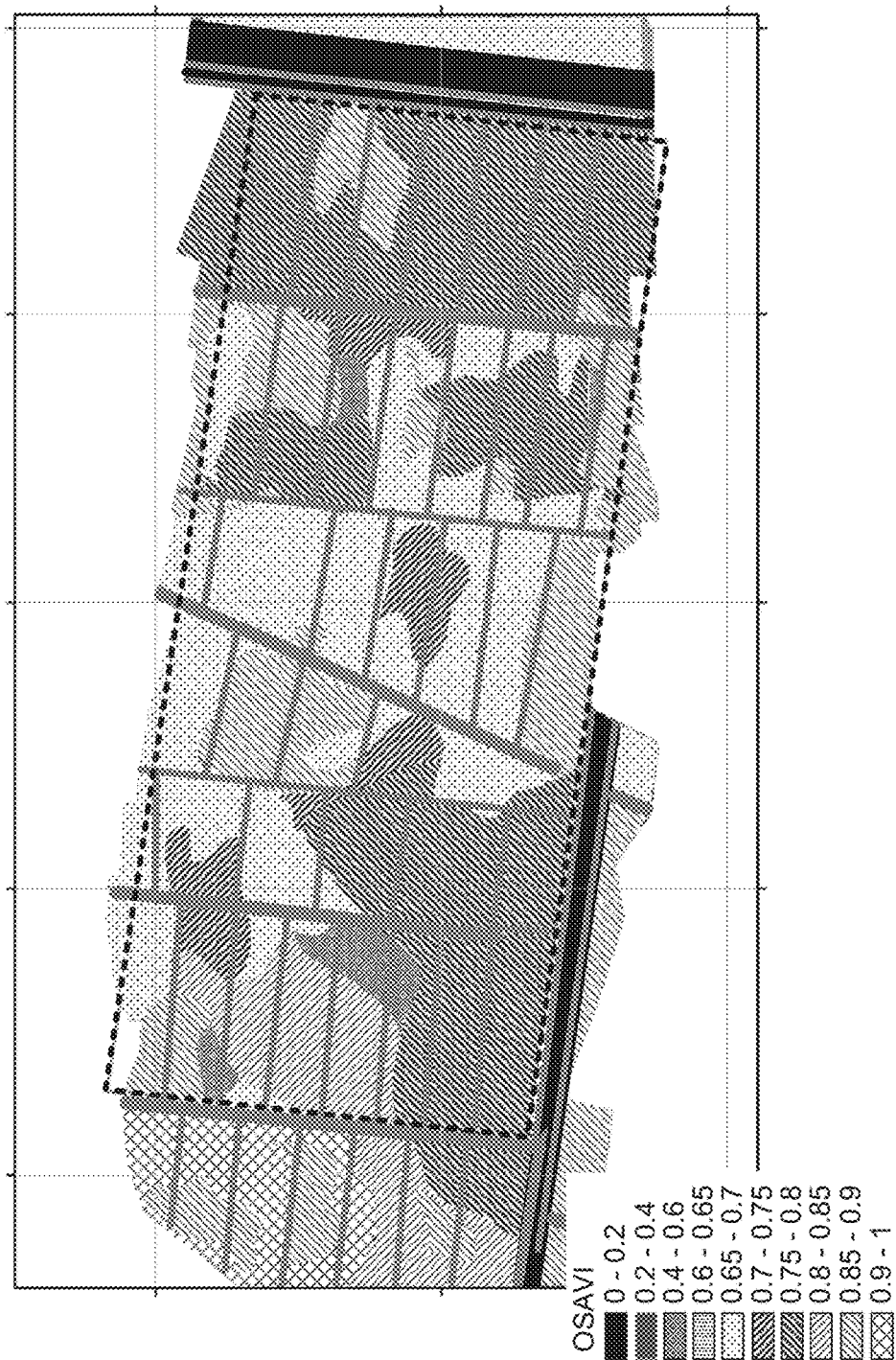
FIG. 11A is a diagram generated by processing discrete band images of a multispectral image, consistent with some embodiments of the present disclosure.

Referring again to FIG. 5, in step 550, UAV 100 or control system 200 identifies one or more vegetation indices in multiple regions based on the multispectral image generated in step 530. FIG. 11A is a diagram 1100a generated by processing discrete band images of a multispectral image, consistent with some embodiments of the present disclosure. Particularly, diagram 1100a shown in FIG. 11A and orthophoto image 800g shown in FIG. 8G cover the same target area (denoted by the dashed line border). As shown in FIG. 11A, the generated multispectral diagram 1100a includes vegetation index information of the target area. Various vegetation indices (VIs) can be used to characterize vegetation canopies. One example VI is called a Normalized Difference Vegetation Index (NDVI). For example, an NDVI value between −1 to −0.1 may indicate an area of water, ice, or cloud, an NDVI value between −0.1 to 0.1 may indicate an area of barren rock, sand, or snow, an NDVI value between 0.1 to 0.2 may indicate an area of soil, an NDVI value between 0.2 to 0.4 may indicate an area of shrubs and grasslands, an NDVI value between 0.4 to 0.8 may indicate an area of dense vegetation, and an NDVI value between 0.8 to 1 may indicate an area of temperate or tropical forest canopies.

Another example VI is called a Soil-Adjusted Vegetation Index (SAVI), which improves NDVI based on soil conditions and dense canopy. As shown in FIG. 11A, UAV 100 or control system 200 can calculate and obtain an Optimized Soil-Adjusted Vegetation Index (OSAVI) value based on multispectral diagram 1100a. In multispectral diagram 1100a, different filling patterns are used for pixels in multispectral diagram 1100a to indicate different OSAVI values of corresponding zones in the target area. In a colorized image, different colors may also be used to indicate the OSAVI values in the target area to visualize the vegetation index information in multispectral diagram 1100a.

Figure 11B:
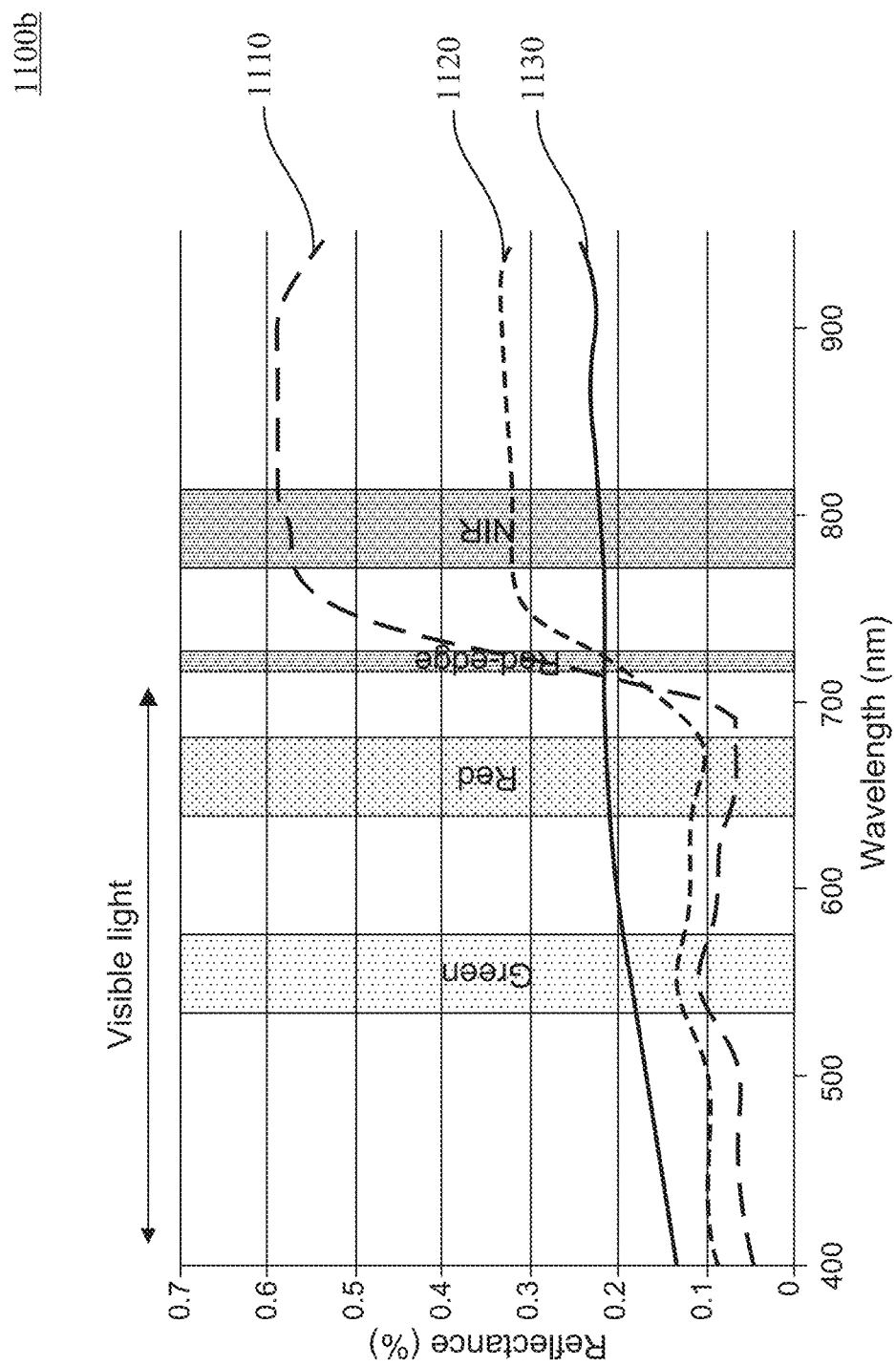
FIG. 11B is a graphical representation of reflectance of soil and plants with different health conditions at different wavelengths, consistent with some embodiments of the present disclosure.

Referring again to FIG. 5, in step 560, UAV 100 or control system 200 assesses crop conditions in the regions based on one or more of the vegetation indices and the corresponding crop information in the regions. FIG. 11B is a graphical representation 1100b of the reflectance of soil and plants with different health conditions at different wavelengths, consistent with some embodiments of the present disclosure. In graphical representation 1100b, curves 1110, 1120, and 1130 respectively indicate the reflectances of a healthy plant sample, a stressed plant sample, and a soil sample at different wavelengths. The absorption and reflectance of plants at different wavelengths are related to chlorophyll and spongy mesophyll of the plants and the water absorption.

Particularly, in the visible waveband, the reflectance of plants is generally dominated by chlorophyll and pigment content. The NDVI or OSAVI value can be used to indicate a greenness condition of the region. Higher NDVI and OSAVI values indicate higher chlorophyll content and greener vegetation. On the other hand, nutrient deficiency, illness, and/or pest infection will reduce chlorophyll content and lower NDVI and OSAVI values.

Figure 11C:
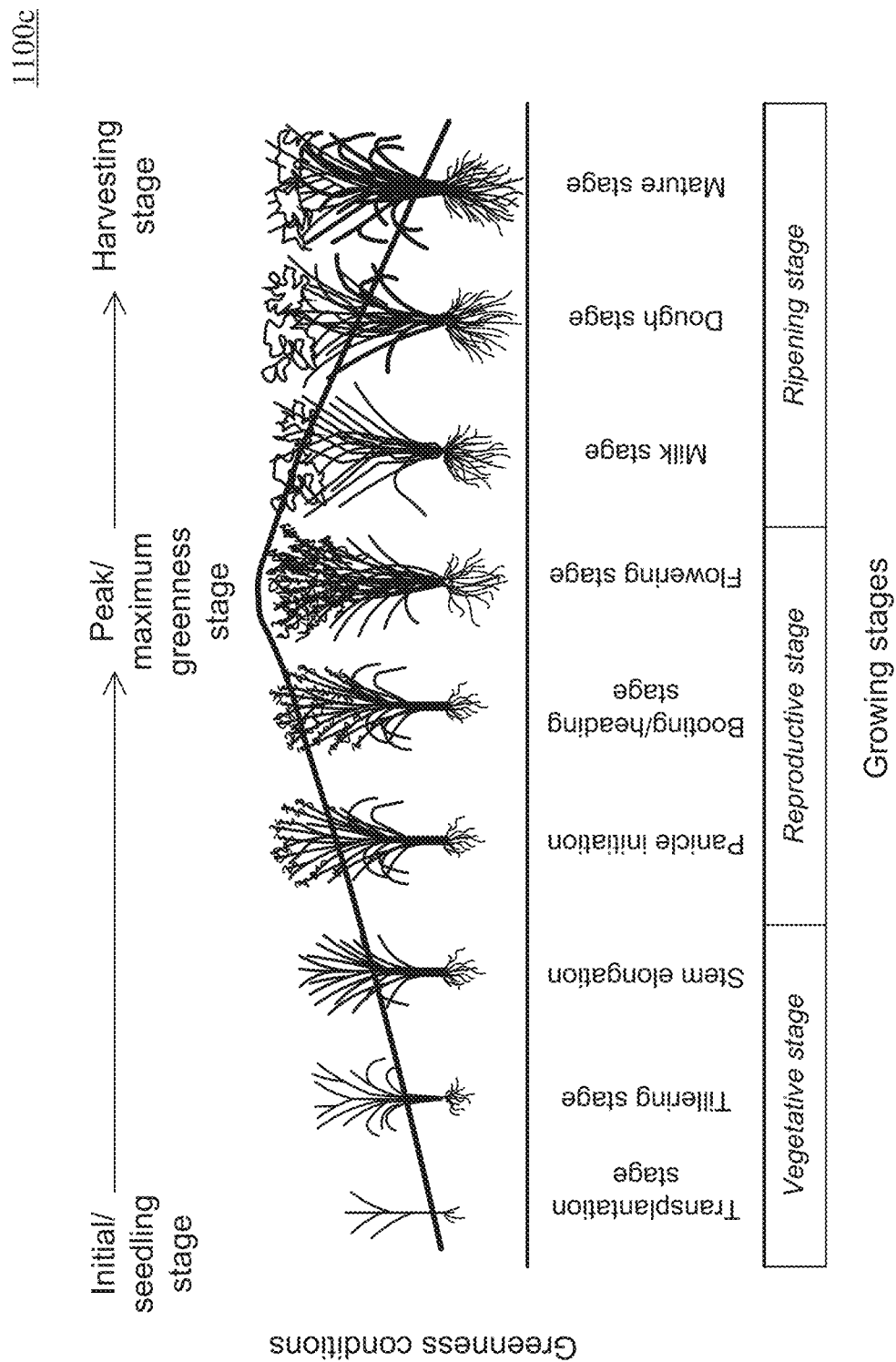
FIG. 11C illustrates variation of greenness condition during different growth stages of rice, consistent with some embodiments of the present disclosure.

In addition to the NDVI and OSAVI values, species of the plant, growth stages of the plant, or both, can be taken into consideration when control system 200 evaluates health condition of the plants in regions 810-866. In the following paragraphs, how greenness condition varies during different growth stages of the plant is discussed with reference to the accompanying drawings. FIG. 11C illustrates variation of the greenness condition during different growth stages of rice in a diagram 1100c, consistent with some embodiments of the present disclosure. As shown in diagram 1100c, from seeding to harvesting, the greenness condition of the rice depends on growth stages of the rice.

Stages of life for rice may include a vegetative stage, a reproductive stage and a ripening stage. During the vegetative stage, a plant grows stems and leaves. Particularly, the vegetative stage may be divided into substages, such as a seedling transplantation stage, a tillering stage, and a stem elongation stage.

During the seedling transplantation stage, seminal roots and leaves continue to develop. Then, tillering begins and signals the start of the tillering stage. The tillering stage extends from the appearance of a first tiller until a maximum number of tillers is reached. Then, the rice enters the stem elongation stage. The stem begins to lengthen and stops growing in height before a panicle begins to form.

Then, the plant enters its reproductive stage with panicle initiation. The reproductive stage may also be divided into substages including a panicle initiation stage, a booting and heading stage and a flowering stage. In the reproductive stage, the panicle starts to form in the base of the shoots or stems. A bulging of the leaf stem conceals the developing panicle and the tip of the developing panicle emerges from the stem and continues to grow, until the panicle is fully visible. These events are called "booting" and "heading." After the booting and heading stage, flowering begins. As shown in FIG. 11C, the greenness condition of the rice increases in the vegetative stage and the reproductive stage and reaches the peak at the flowering stage.

After the flowering, the rice transitions from the reproductive stage to the ripening stage. Particularly, the ripening stage can be divided into various stages, such as a milk stage, a dough stage, and a mature stage. The duration of the ripening stage varies among varieties and may be affected by temperature or other weather condition in different regions. As shown in FIG. 11C, the greenness condition of the rice during the ripening stage gradually decreases as the rice matures and is ready for harvesting.

While rice is discussed as an example in the embodiments of FIGS. 11A-11C, different types of crops may have similar or different characteristics in their stages of life. For example, in some embodiments, the target area may include two or more types of crops, or the same crop in different growth stages. The crops may be rice, sugarcane plants, mango trees, or any other types of cultivated plants.

Accordingly, in order to interpret the NDVI or OSAVI information properly, UAV 100 or control system 200 may consider species of the crops and their growth stages in the life cycle when assessing crop conditions (e.g., health condition of the crops) in step 560.

Figure 12:
FIG. 12 is a diagram illustrating an assessment map based on the orthophoto image shown in FIG. 8G, consistent with some embodiments of the present disclosure.

FIG. 12 is a diagram illustrating an assessment map 1200 based on the orthophoto image shown in FIG. 8G, consistent with some embodiments of the present disclosure. As shown in FIG. 12, for each of regions 810-866 of the target area in orthophoto image 800g of FIG. 8G, an average or a representative VI value (e.g., a representative OSAVI value) can be calculated or identified based on the VI information from multispectral diagram 1100a shown in FIG. 11A. Accordingly, control system 200 may perform health analysis of plantation in the target area and visualize the processed data and display assessment map 1200 via a user interface, such as display device 220, or other electronic devices communicatively coupled to control system 200. For example, assessment map 1200 may be displayed on a computer, a smart phone, or a tablet.

Particularly, in some embodiments, when assessing crop conditions in step 560, control system 200 may retrieve one or more threshold values for each of regions 810-866 based on the crop information. Responsive to different types of crops or different growth stages, threshold values for regions 810-866 may be different. Then, control system 200 may compare the vegetation index information of each of regions 810-866 and the retrieved threshold value(s). Accordingly, control system 200 may determine the crop conditions in the regions 810-866, responsive to a comparison between the vegetation index information and the threshold value(s).

The number of the threshold values may be determined based on needs. In the embodiments shown in FIG. 12, three threshold values are set for rice fields based on experimental data. For example, the three threshold values for rice fields may be 0.7, 0.8, and 0.85. Assuming that regions 810-866 are rice fields, control system 200 compares OSAVI values of regions 810-866 and these threshold values to assign a condition level (e.g., good, acceptable, attention-required, severe, etc.) for each of regions 810-866. Regions (e.g., regions 822 and 846) with a corresponding OSAVI value between 0.85 to 1 are considered in good condition. Regions (e.g., regions 812, 813, etc.) with a corresponding OSAVI value between 0.8 to 0.85 are considered in acceptable condition. Regions (e.g., regions 810, 811, etc.) with a corresponding OSAVI value between 0.7 to 0.8 require attention. Regions (e.g., regions 820 and 865) with a corresponding OSAVI value between 0 to 0.7 are considered in severe condition where immediate attention and action is required. In some embodiments, high variations of OSAVI values occur within each paddy field, and control system 200 may further divide one or more regions 810-866 into subregions for assessments.

Accordingly, control system 200 may assign corresponding condition levels for regions 810-866 based on the crop conditions, and generate an annotated map indicating corresponding condition levels for regions 810-866. As shown in FIG. 12, regions 810-866 having different condition levels may be filled or marked using different filling patterns or colors in the annotated map. In some embodiments, control system 200 may further apply various sound or animation effect, such as blinking texts or borders, to further highlight region(s) that require immediate attention and action.

In some embodiments, in response to determining the crop condition is a poor crop condition in one of the regions, control system 200 may further identify a cause based on the orthophoto image of the region with the poor crop condition. For example, by performing a more detailed image recognition analysis, control system 200 may identify missing plants and soil exposed in the region, which result in a low OSAVI value. In another example, control system 200 may identify bleaching and withering of sugarcane's top leaves in the orthophoto image of the region. Control system 200 may display a corresponding warning in assessment map 1200 accordingly to alert these damages, which may be caused by cicadas.

Referring again to FIG. 5, in step 570, UAV 100 or control system 200 generates a suggestion for remedial action based on the assessment of the crop conditions for the regions. For example, responsive to the cause identified in step 560, control system 200 may provide a suggestion for remedial action. In some embodiments, the suggestion for remedial action may include a recommendation of weed control, pesticide application, herbicide application, watering, or fertilizer application, or any combination thereof for the region with the poor crop condition.

In step 580, control system 200 controls UAV 100 to perform one or more corresponding remedial actions to one or more regions in the target area. For example, control system 200 controls UAV 100 with corresponding payload device(s) 160 installed to spray water, one or more fertilizers, one or more pesticides, or one or more herbicides, or any combination thereof, on one or more regions 810-866 in the target area based on the assessment of the crop conditions. Accordingly, if water or nutrient deficiency is identified in one region, UAV 100 can provide precise watering or fertilizers accordingly. Alternatively, if the assessment indicates that pests or weeds control is required in another region, UAV 100 can also apply pesticide or herbicide treatment accordingly to the region(s) to achieve more precise farming management. UAV 100 may perform these remedial actions with corresponding payload device(s) 160 discussed in above paragraphs. Various solid stream nozzles, flat fan spray nozzles, and sprinkler attachments can be used for applying pre-emergence herbicides, post-emergence systemic herbicides, or liquid or granular fertilizers.

In some embodiments, when generating the suggestion for remedial action and controlling UAV 100 to perform the actual remedial action in steps 570 and 580, control system 200 may also receive environmental information for the regions from different sources. Accordingly, control system 200 may generate the suggestion for remedial action based on both the assessment of the crop conditions and the environmental information. For example, the environmental information may include historical weather data, real-time weather data, or weather forecasting data, or any combination thereof, which may be obtained from one or more weather databases.

In some embodiments, various types of sensors may be located in the regions and configured to measure and record environmental parameters, such as temperature, pH value, nutrient status, etc. The environmental information may also include data obtained from these sensors. For examples, sensors located in one or more regions 810-866 may include one or more light sensors, one or more temperature sensors, one or more humidity sensors, one or more soil moisture sensors, etc.

In view of above, in various embodiments of the present disclosure, UAV 100 and control system 200 can capture both RGB images and discrete band images and perform corresponding image processing operations to obtain crop information in different regions and vegetation index information in different regions, and assess crop conditions in different regions accordingly. In some embodiments, UAV 100 may further perform corresponding remedial actions to the regions based on the assessment results to achieve image-guided agriculture and autonomous farming.

The various example embodiments herein are described in the general context of method steps or processes, which may be implemented in one aspect by a computer program product, embodied in a transitory or a non-transitory computer-readable medium, which stores computer-executable instructions, such as program code, executed by computers in networked environments. A computer-readable medium may include removable and nonremovable storage devices including, but not limited to, Read Only Memory device (ROM), Random Access Memory device (RAM), compact discs (CDs), digital versatile discs (DVD), etc.

Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a module may include A or B, then, unless specifically stated otherwise or infeasible, the module may include A, or B, or A and B. As a second example, if it is stated that a module may include A, B, or C, then, unless specifically stated otherwise or infeasible, the module may include A, or B, or C, or A and B, or A and C, or B and C, or A and B and C.

In the drawings and specification, there have been disclosed exemplary embodiments. It will be apparent to those skilled in the art that various modifications and variations can be made to the disclosed apparatuses, systems, and related methods. Other embodiments will be apparent to those skilled in the art from consideration of the specification and practice of the disclosed apparatuses, systems, and related methods. It is intended that the specification and examples be considered as exemplary only, with a true scope being indicated by the following claims and their equivalents.

What is claimed is:

1. A non-transitory computer-readable medium which stores instructions executable by a processor to perform a method for image-guided agriculture, the method for image-guided agriculture comprising:
- controlling an unmanned aerial vehicle to capture a plurality of images based on a plurality of ground sampling distance values;
- processing the plurality of images to generate an orthophoto image of a target area;
- performing feature classification of the orthophoto image to identify corresponding crop information in a plurality of regions of the target area; and
- assessing crop conditions in the plurality of regions based on one or more vegetation indices and the corresponding crop information in the plurality of regions,
- wherein the controlling the unmanned aerial vehicle further comprises:
  - determining different ones of the plurality of ground sampling distance values for the plurality of images corresponding to the plurality of regions; and
  - adjusting a flight altitude of the unmanned aerial vehicle when the unmanned aerial vehicle is navigating through the plurality of regions.

2. The non-transitory computer-readable medium of claim 1, wherein the controlling further comprises:
- controlling the unmanned aerial vehicle to navigate through the target area; and
- controlling one or more cameras installed on the unmanned aerial vehicle to capture the plurality of images.

3. The non-transitory computer-readable medium of claim 2, wherein the controlling the unmanned aerial vehicle further comprises:
- adjusting the flight altitude of the unmanned aerial vehicle according to the different ones of the plurality of ground sampling distance values.

4. The non-transitory computer-readable medium of claim 2, wherein the processing comprises:
- aligning the plurality of images based on a route of the unmanned aerial vehicle;
- reconstructing a dense point cloud based on the plurality of images and corresponding camera positions;
- building a polygonal mesh model of the target area based on the dense point cloud; and
- generating the orthophoto image based on the polygonal mesh model of the target area.

5. The non-transitory computer-readable medium of claim 1, further comprising:
- generating a tiled model based on the orthophoto image to identify the plurality of regions of the target area.

6. The non-transitory computer-readable medium of claim 1, wherein the corresponding crop information includes types of crops in the plurality of regions and corresponding plant growth stages in the plurality of regions.

7. A method for image-guided agriculture, comprising:
- capturing a plurality of images based on a plurality of ground sampling distance values;
- processing the plurality of images to generate an orthophoto image of a target area;
- performing feature classification of the orthophoto image to identify corresponding crop information in a plurality of regions of the target area; and
- assessing crop conditions in the plurality of regions based on one or more vegetation indices and the corresponding crop information in the plurality of regions,
- wherein the capturing the plurality of images comprises controlling an unmanned aerial vehicle to navigate through the target area by:
  - determining different ones of the plurality of ground sampling distance values for the plurality of regions; and
  - adjusting a flight altitude of the unmanned aerial vehicle when the unmanned aerial vehicle is navigating through the plurality of regions.

8. The method of claim 7, wherein the capturing the plurality of images further comprises:
- capturing the plurality of images by one or more cameras installed on the unmanned aerial vehicle.

9. The method of claim 8, wherein the controlling the unmanned aerial vehicle comprises:
- adjusting the flight altitude of the unmanned aerial vehicle according to the plurality of ground sampling distance values.

10. The method of claim 8, wherein the processing the plurality of images comprises:
- aligning the plurality of images based on a route of the unmanned aerial vehicle;
- reconstructing a dense point cloud based on the plurality of images and corresponding camera positions;
- building a polygonal mesh model of the target area based on the dense point cloud; and
- generating the orthophoto image based on the polygonal mesh model of the target area.

11. The method of claim 7, further comprising:
- generating a tiled model based on the orthophoto image to identify the plurality of regions of the target area.

12. The method of claim 7, further comprising:
- identifying the corresponding crop information including types of crops and corresponding plant growth stages in the plurality of regions.

13. A system for image-guided agriculture, comprising:
- an unmanned aerial vehicle, comprising:
  - one or more motors configured to drive one or more propulsion units of the unmanned aerial vehicle; and
  - one or more cameras installed on the unmanned aerial vehicle; and
- a server comprising a memory device storing instructions and a processor coupled to the memory device, the processor being configured to execute the instructions to:
  - cause the unmanned aerial vehicle to navigate the unmanned aerial vehicle through a target area along a route;
  - cause the unmanned aerial vehicle to capture a plurality of images by the one or more cameras based on a plurality of ground sampling distance values during the navigation;
  - process the plurality of images to generate an orthophoto image of a target area;
  - perform feature classification of the orthophoto image to identify corresponding crop information in a plurality of regions of the target area;
  - assess crop conditions in the plurality of regions based on one or more vegetation indices and the corresponding crop information in the plurality of regions, and
  - control a flight altitude of the unmanned aerial vehicle by:
    - determining different ones of the plurality of ground sampling distance values for the plurality of regions; and
    - adjusting the flight altitude of the unmanned aerial vehicle when the unmanned aerial vehicle is navigating through the plurality of regions.

14. The system of claim 13, wherein the processor is configured to execute the instructions to cause the unmanned aerial vehicle to capture the plurality of images by:

adjusting the flight altitude of the unmanned aerial vehicle according to the plurality of ground sampling distance values.

15. The system of claim 13, wherein the processor is configured to execute the instructions to process the plurality of images to generate the orthophoto image by:

aligning the plurality of images based on the route of the unmanned aerial vehicle;

reconstructing a dense point cloud based on the plurality of images and corresponding camera positions;

building a polygonal mesh model of the target area based on the dense point cloud; and generating the orthophoto image based on the polygonal mesh model of the target area.

16. The system of claim 13, wherein the processor is configured to execute the instructions to generate a tiled model based on the orthophoto image to identify the plurality of regions of the target area.

17. The system of claim 13, wherein the processor is configured to execute the instructions to identify the corresponding crop information including types of crops and corresponding plant growth stages in the plurality of regions.

* * * * *